United States Patent [19]

Higley et al.

[11] Patent Number: 5,554,411
[45] Date of Patent: Sep. 10, 1996

[54] TREATMENT OF SOLID ELECTROLYTES TO PROMOTE WETTABILITY

[75] Inventors: Lin R. Higley; Janet L. Dalke, both of Troy, Mich.

[73] Assignee: Hughes Aircraft Company, Los Angeles, Calif.

[21] Appl. No.: 350,304

[22] Filed: Dec. 6, 1994

[51] Int. Cl.$^6$ .................................................. B05D 5/12
[52] U.S. Cl. ........................ 427/11; 427/77; 427/123; 427/318; 427/328; 427/383.7; 427/405
[58] Field of Search ............................ 427/11, 77, 123, 427/318, 328, 383.7, 405

[56] References Cited

U.S. PATENT DOCUMENTS

| | | |
|---|---|---|
| 3,765,945 | 10/1973 | Sudworth ................................ 429/52 |
| 3,783,024 | 1/1974 | Gibson et al. |
| 4,183,137 | 1/1980 | Lomerson ................................ 427/11 |
| 4,741,918 | 5/1988 | de Nagybaczon et al. ............... 427/11 |

*Primary Examiner*—Janyce Bell
*Attorney, Agent, or Firm*—Elizabeth E. Leitereg; Terje Gudmestad; W. K. Denson-Low

[57] ABSTRACT

A beta-double prime aluminum oxide solid electrolyte (24) is prepared for wetting by a liquid electrode material. The method includes mechanically rubbing an asperity-filling metal against the surface (32) of the solid electrolyte (24) until the solid electrolyte (24) turns gray in color, which fills in asperities (34) in the surface (32) of the electrolyte (24). The electrolyte (24) and deposited asperity-filling metal (36) are heated to a temperature above the melting point of sodium, and sodium is deposited onto the electrolyte surface (32) and permitted to wick along the surface (32).

14 Claims, 1 Drawing Sheet

TREATMENT OF SOLID ELECTROLYTES TO PROMOTE WETTABILITY

BACKGROUND OF THE INVENTION

This invention relates to electrolytic storage cells that utilize a solid electrolyte, and, more particularly, to the initial wetting of the electrode materials to the electrolyte.

Rechargeable storage cells are electrochemical devices for storing and retaining an electrical charge and later delivering that charge as useful power. A number of such storage cells are typically connected together electrically to form a battery having specific voltage or current delivery capability. Familiar examples of the rechargeable storage cell are the lead-acid storage cell used in automobiles and the nickel-cadmium storage cell used in portable electronic devices such as cameras. Another type of storage cell having a greater storage capacity for its weight is the nickel oxide pressurized hydrogen cell, an important type of which is commonly called the nickel-hydrogen cell and is used in spacecraft applications.

Yet another type of storage cell is the sodium-sulfur storage cell, which has been under development for over 20 years for use in a variety of terrestrial applications such as nonpolluting electric vehicles. The sodium-sulfur storage cell has the particular advantage that its storage capacity per unit weight of storage cell is several times the storage capacity of the nickel-hydrogen cell. The sodium-sulfur storage cell therefore is an attractive candidate for use in spacecraft applications as well as automotive applications.

In general, the sodium-sulfur electrolytic storage cell has an outer housing and a piece of an alumina-based ceramic within the outer housing. Sodium is placed into a first chamber defined on one side of the ceramic, and sulfur is placed into a second chamber on the other side of the ceramic. The storage cell is heated to a temperature of about 350° C., at which temperature both the sodium and the sulfur are molten. The liquid sodium is the anode of the storage cell, the liquid sulfur is the cathode, and the solid ceramic is the electrolyte. Electrical energy is released when sodium ions diffuse through the ceramic into the sulfur, thereby forming sodium polysulfides. Electrical energy can be stored when the process is reversed during charging of the battery, with an applied voltage causing the sodium polysulfides to decompose to yield sodium and sulfur, and the sodium ions diffuse through the ceramic electrolyte back into the first chamber.

One configuration of the sodium-sulfur cell is known as the "planar" cell. The term "planar" is used in this context to mean that the ceramic electrolyte is generally planar. Other configurations such as tubular forms having a cylindrical tubular electrolyte are also known. The planar design has the advantage that the active area of electrolyte is relatively larger per unit weight of cell than for a cylindrical design. Planar sodium-sulfur cells are disclosed in U.S. Pat. Nos. 3,765,945 and 3,789,024, for example.

One of the problems encountered in the use of sodium-sulfur cells, and particularly in relation to planar sodium-sulfur cells, is achieving initial wetting of the liquid sodium to the beta-double prime aluminum oxide electrolyte. The wetting angle of sodium to aluminum oxide is only about 90 degrees, and therefore the sodium does not easily wet and spread on the aluminum oxide. If wetting is not achieved, there may be start-up inconsistencies and uneven current densities at start-up of the cell. These effects may result in unsatisfactory performance of the electrolytic cell over extended periods of operation.

There have been proposed several techniques for improving the initial wetting of the electrolyte by liquid sodium. In one, lead is deposited upon the electrolyte surface by autoabrasion. The use of the lead deposition approach can result in contamination of the electrolyte, particularly along its grain boundaries, leading to premature failure of the electrolyte during service.

In another approach, the electrolyte is exposed to lead acetate solution by coating the electrolyte with an aqueous solution of the lead acetate. Lead acetate deposited upon the electrolyte aids in achieving initial wetting when the lead acetate at the surface is reduced to lead in contact with the molten sodium of the cell. However, the aluminum oxide is sensitive to water, and therefore a drying step is required. The lead can be dissolved into the sodium during service, leading to long-term sodium-ion displacement in the aluminum oxide. This can result in localized strain within the electrolyte, leading to its premature failure. The lead acetate approach may also be unacceptable because of its slow reaction rate.

There is therefore a need for an improved approach to achieving wetting of the electrolyte by the electrode material, and specifically improving the wettability of aluminum oxide by sodium. The present invention fulfills this need, and further provides related advantages.

SUMMARY OF THE INVENTION

The present invention provides an improved technique for rendering the ceramic electrolyte of an electrolytic storage cell more wettable by the molten electrode material. It is of specific applicability to improving the wettability of beta-double prime aluminum oxide by sodium. The approach is readily utilized without costly equipment and chemicals, and does not damage the electrolyte or contaminate the electrolytic cell. Wetting of the sodium to the electrolyte is achieved within a few minutes rather than in excess of 10 hours as in some prior approaches.

In accordance with the invention, a method of preparing a solid electrolyte of an electrolytic cell for wetting by a liquid electrode material comprises the steps of furnishing a solid electrolyte of an electrolytic cell and depositing an asperity-filling metal onto the surface of the solid electrolyte in an amount sufficient to fill surface asperities in the solid electrolyte. The method further includes heating the electrolyte and deposited asperity-filling metal to a temperature sufficient to melt a cell electrode material, and depositing an amount of the cell electrode material onto the electrolyte surface and permitting the liquid cell electrode material to wick along the surface of the electrolyte.

As applied to the preferred electrolyte for sodium-sulfur electrolytic storage cells, a method of preparing a beta-double prime aluminum oxide solid electrolyte for wetting by a liquid electrode material comprises the steps of furnishing a solid beta-double prime aluminum oxide electrolyte of an electrolytic cell and mechanically rubbing an asperity-filling metal such as nickel against the surface of the solid electrolyte until the solid electrolyte turns gray in color. The method further includes heating the electrolyte and deposited asperity-filling metal to a temperature above the melting point of sodium, depositing sodium onto the electrolyte surface, and permitting the liquid cell electrode material to wick along the surface of the electrolyte.

The present approach is readily implemented by rubbing an asperity-filling metal such as nickel, copper, or a 300- series stainless steel onto the surface of the electrolyte. (As sometimes used herein, "nickel" includes pure nickel and its alloys, and "copper" includes pure copper and its alloys, as long as the alloys in each case are sufficiently soft to permit their application to the surface of the electrolyte.) Lead and its alloys may not be used as the asperity-filling metal. The asperity-filling material can be furnished as a powder, preferably less than 10 micrometers in diameter and most preferably from about 2 to about 3 micrometers in diameter. The asperity-filling metal can also be furnished in bulk form, such as a bar of metal rubbed against the surface of the electrolyte or a brush with bristles made of the metal.

The asperity-filling metal is rubbed against the surface of the electrolyte until the surface asperities are filled. This condition may be judged by observing a change in the color of the surface from white to gray, in the case of beta-double prime aluminum oxide. This implementation is particularly attractive because it does not require complex application procedures and apparatus. The metal is simply rubbed onto the surface of the electrolyte.

After the asperity-filling metal is transferred to the surface of the electrolyte, the electrolyte is heated to a temperature at which the metallic electrode material, sodium in the preferred case, molten. A preferred initial heating temperature is about 150° C. A bead of the sodium is melted onto the surface, forming a small molten ball. The temperature is then increased, preferably to about 265° C., so that the sodium is wicked across the surface.

The wettabllity-enhancing pretreatment is complete. The electrolyte is assembled into the electrolytic cell and loaded with the electrode materials, sodium and sulfur. The cell is ready for operation. Alternatively, the cell can be filled with the electrode materials prior to the heating and wicking steps, and the sodium electrode material will wet and wick along the surface of the electrolyte.

This approach improves the wettability of the electrode of a solid-electrolyte cell, so that it achieves start up quickly and without adverse effects. The sodium-facing surface of the electrolyte is completely wetted by the sodium from the start. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
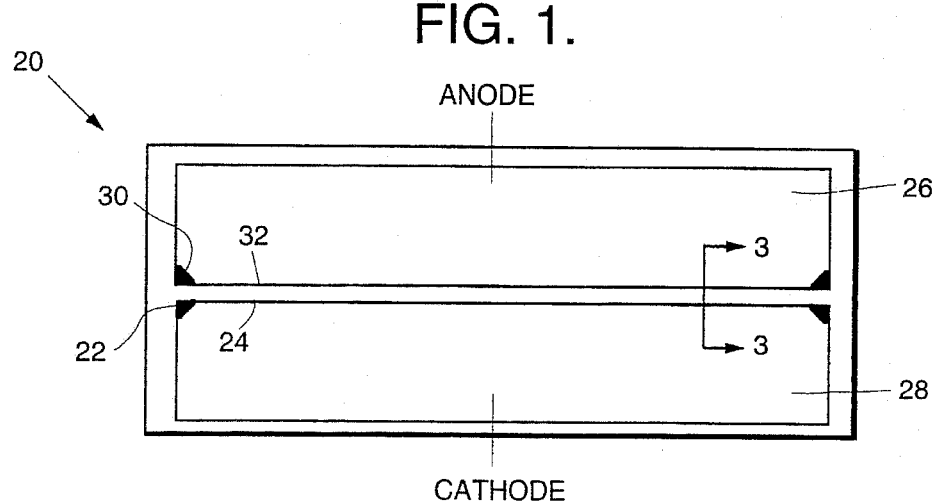
FIG. 1 is a schematic view of a planar sodium-sulfur electrolytic cell.

FIG. 1 illustrates a simplified sodium-sulfur electrolytic storage cell 20, with which the present invention is preferably used. A planar cell is Illustrated, but the present invention can be used with other configurations of cell. The electrolytic storage cell 20 includes a housing 22 in which the other components are sealed for operation. A planar piece of a ceramic electrolyte 24 divides the storage cell 20 into two parts, defining a first chamber 26 and a second chamber 28. This depiction shows the primary structural components of the cell 20, but design details not relevant to the present invention are omitted. Practical batteries are formed by combining a number of the illustrated cells in the appropriate electrically parallel or series configurations.

The electrolyte 24 is a ceramic material that permits the rapid diffusion of sodium ions therethrough. In its most preferred form, the ceramic electrolyte 24 is beta-double prime alumina of a composition of about 90 percent aluminum oxide, 9 percent sodium oxide, and 1 percent lithium oxide. (All compositions herein are in percent by weight, unless otherwise indicated.) The electrolyte 24 is preferably less than 0.025 inches in thickness, more preferably is about 0.016 to about 0.020 inches in thickness, and most preferably is about 0.020 inches in thickness. The applicability of the present invention is not limited to any particular configuration, composition, or thickness of electrolyte, however. The electrolyte 24 is sealed to the inside of the wall of the container 22 using a glass seal 30, so that matter must pass through the electrolyte 24 to move between the chambers 26 and 28.

Metallic sodium is loaded into the first chamber 26 and sulfur is placed into the second chamber 28. In operation, the storage cell is heated to a temperature of about 350° C., at which temperature both the sodium and the sulfur are molten. The liquid sodium in the first chamber 26 is the anode of the storage cell, the liquid sulfur in the second chamber 28 is the cathode. Electrical energy is released when sodium ions diffuse through the electrolyte 24 into the second chamber 28, thereby forming sodium polysulfides. Electrical energy can be stored when the process is reversed during charging of the cell 20, with an applied voltage causing the sodium polysulfides to decompose to yield sodium and sulfur, and the sodium ions diffuse from the second chamber 28 through the ceramic electrolyte 24 and back into the first chamber 26.

Thus, metallic sodium contacts a surface 32 of the electrolyte 24 during operation of the cell 20. It is critical that the metallic sodium wet the surface 32, or diffusion of the sodium into the electrolyte 24 cannot occur. The most difficult aspect of wetting the electrolyte surface is achieving an initial wetting for the start-up of the cell 20. Once wetting is initially achieved, it will not be lost with continued operation of the cell.

Figure 2:
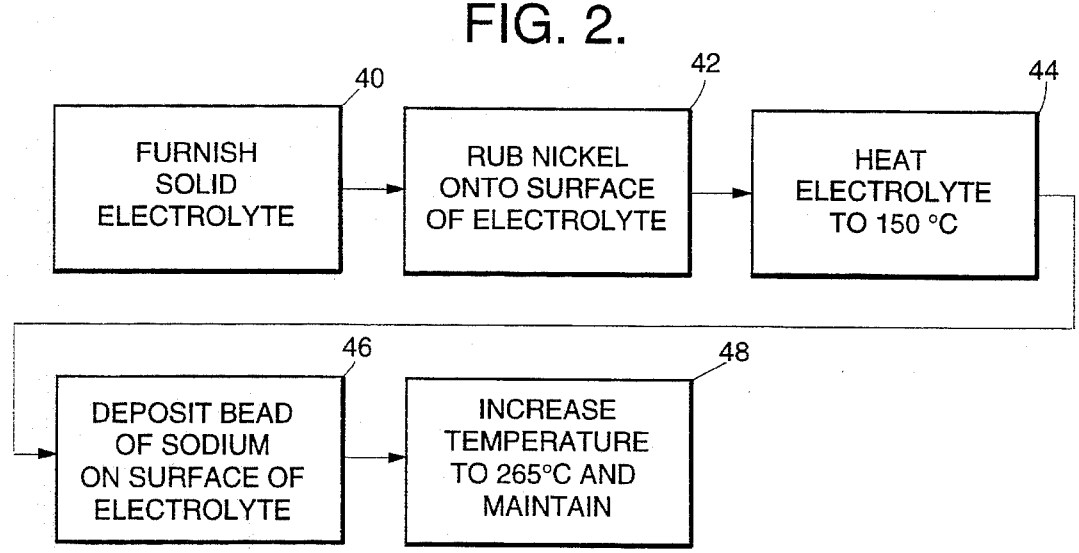
FIG. 2 is a process flow diagram for a preferred approach to enhancing the wettability of the electrolyte.
Figure 3:
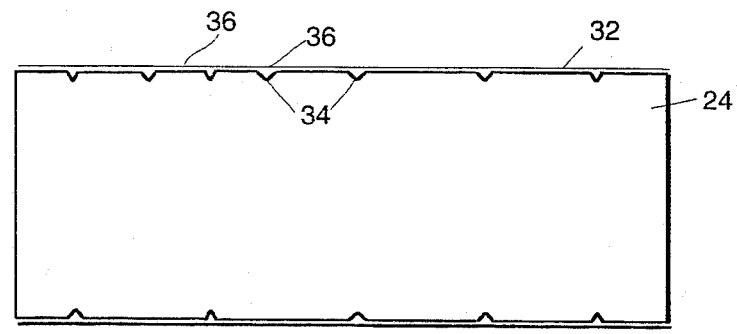
FIG. 3 an enlarged, idealized schematic view of the electrolyte of the electrolytic cell of FIG. 1, taken along line 3—3.

The present invention provides a method for improving the initial wettability of the surface 32 of the electrolyte 24, so that the sodium quickly wets the surface 32 even at initial contact and start-up of the cell 20. FIG. 2 illustrates the preferred procedure for wettability enhancement and achieving wetting. FIG. 3 illustrates the (greatly enlarged and magnified) profile of the surface 32 of the electrolyte 24, and the effect of the processing of the invention.

Referring to FIG. 2, the solid electrolyte 24 of the configuration, dimensions, and composition discussed previously is furnished, numeral 40. An asperity-filling metal such as nickel is rubbed onto the sodium-facing surface 32 of the electrolyte 24, numeral 42. Other relatively soft, abradable metals such as nickel alloys, copper and its alloys, and 300-series stainless steels can also be used. Lead and its alloys may not be used, and are therefore not within the scope of the term "asperity-filling metal", due to adverse effects on the operation and service life of the cell.

The nickel or other asperity-filling metal is preferably provided as dry nickel powder having a reduced surface and of diameter less than about 10 micrometers, and preferably about 2–3 micrometers. The rubbing treatment is continued until the surface of the electrolyte 24 becomes gray in color, a visual indication of the transfer of metal to the surface. The rubbing action is best accomplished using a brush having nickel or nickel-alloy wire bristles and takes less than one minute for a typically sized electrolyte 24.

The following explanation of the effect of the nickel placed onto the surface is believed to be correct. However, the operability of the invention is not dependent upon any particular explanation of the invention. It is believed that the nickel fills in surface asperities (irregularities), as shown in FIG. 3. Generally, all surfaces such as the surface 32 have small asperities 34, such as roughness and pits, at the free surfaces. These asperities can interfere with the initial wetting of the surface with a liquid such as liquid sodium, inasmuch as they inhibit the spreading of a droplet. It is believed that the nickel fills in the asperities 32 so that an effectively smoother surface is presented. Sodium can therefore spread more readily on the surface by micro-bridging over the asperities. In FIG. 3, nickel is indicated at numeral 36 both in the asperities 34 and at the surface 32. This indication of the presence of nickel should not be interpreted as a continuous layer, although it is believed that nickel is present over most of the surface 32 after the rubbing treatment. The fine oxide containing the nickel particles at the surface is quite reactive with sodium and aids in accomplishing rapid wetting of the sodium to the treated surface.

The nickel may be deposited by other techniques than rubbing. Rubbing is preferred, because the mechanical action preferentially deposits nickel into the asperities 34. Rubbing transfer of metal is also quick and easy to perform. The preferred source of the nickel is powder, as discussed. However, nickel may also be transferred from bulk nickel sources, such as a bar of nickel or a brush with nickel bristles. When the nickel is transferred from such a bulk source, care is required to avoid damaging the surface 32.

After the nickel has been transferred to the surface 32, the electrolyte is assembled into the cell 20. Sodium and sulfur are loaded into their respective compartments. The assembly is heated in vacuum to a temperature above the melting point of sodium, preferably about 150° C., resulting in the formation of beads of sodium in contact with the surface 32 on the sodium side of the electrolyte. The beads of molten sodium form balls on the surface and do not initially spread along the surface. Once the beads are in place, the temperature is increased to a higher temperature, preferably about 265° C. At this temperature, the sodium balls spread spontaneously along the surface 32 by a wicking action. The wicking proceeds relatively quickly, and only about one minute or less is required to complete wetting. When testing is performed, the progress of the wicking can be followed visually by the increased silvery appearance of the surface over which the molten sodium has spread. In practicing the invention with an actual cell, the surface is not visually accessible.

After the wettability enhancement treatment and initial wetting are complete, the cell is ready for service operation.

A comparative study was performed to determine the effect of the pretreatment on wettabllity of the sodium to the electrolyte. A first piece of beta-double prime aluminum oxide electrolyte material was treated by rubbing a small amount of nickel powder having a diameter of 2–3 micrometers onto the surface of the electrolyte, until the surface changed from white to gray in color. The first electrolyte was heated to about 150° C. and a quantity of sodium metal was melted onto the surface to form a metal ball. The temperature was increased to about 265° C. The sodium in the ball wicked along the nickel and thence the surface of the electrolyte. Progress of the wetting was observed visually by a darkening of the surface of the electrolyte. The same procedure was followed for a second piece of the beta-double prime aluminum oxide electrolyte, except that the second piece was not rubbed with nickel before heating.

The first (treated) electrolyte exhibited a reduced surface resistivity of about 7 ohm-centimeters after 30 minutes, indicating wetting of the surface by the sodium. Achieving the same wetting required about 12 hours of heating in the case of the second (untreated) electrolyte. Thus, the present approach achieved a surface wetted by sodium much more quickly than observed for an untreated electrolyte surface. This faster wetting would be important in the case of an actual cell, to permit functioning of the charging/discharging cycle upon start-up of the cell.

The present invention thus improves the wettability of solid electrolyte surfaces for use in electrolytic cells. The approach of the invention does not compromise long-term operation of the cell resulting from lead contamination to gain start-up wetting. Although a particular embodiment of the invention has been described in detail for purposes of illustration, various modifications may be made without departing from the spirit and scope of the invention. Accordingly, the invention is not to be limited except as by the appended claims.

What is claimed is:

1. A method preparing a solid electrolyte of an electrolytic cell for wetting by a liquid electrode material, comprising the steps of:

furnishing a solid electrolyte of a ceramic material that permits diffusion of sodium ions therethrough;

depositing an asperity-filling metal on a surface of the solid elecrolyte in an amount sufficient to fill surface asperities in the solid electrolyte, the asperity-filling metal being selected from the group consisting of nickel and its alloys, copper and its alloys, and 300-series stainless steel, but not lead and its alloys;

heating the electrolyte and deposited asperity-filling metal to a temperature sufficient to melt a cell electrode material; and depositing a quantity of sodium as the cell electrode material onto the electrolyte surface upon which the asperity-filling metal has been deposited, and permitting the sodium cell electrode material to wick along the surface of the electrolyte.

2. The method of claim 1, wherein the step of furnishing a solid electrolyte includes the step of furnishing beta-double prime aluminum oxide as the solid electrolyte.

3. The method of claim 1, wherein the step of depositing an asperity-filling metal includes the step of rubbing an asperity-filling metal onto the surface.

4. The method of claim 1, wherein the step of depositing an asperity-filling metal includes the steps of furnishing a piece of bulk asperity-filling metal, and rubbing the piece of bulk asperity-filling metal against the surface of the electrolyte.

5. The method of claim 1, wherein the step of depositing an asperity-filling metal includes the step of rubbing asperity-filling metal powder onto the surface.

6. The method of claim 5, wherein the step of rubbing asperity-filling metal powder includes the step of providing asperity-filling metal powder with a particle size of from about 2 to about 3 micrometers.

7. The method of claim 1, wherein the step of depositing an asperity-filling metal includes the step of providing nickel as the asperity-filling metal.

8. A method of preparing a beta-double prime aluminum oxide solid electrolyte for wetting by liquid sodium, comprising the steps of:

furnishing a solid electrolyte of an electrolytic cell, the solid electrolyte being made of beta-double prime aluminum oxide;

mechanically rubbing an asperity-filling metal against the surface of the solid electrolyte until the surface of the solid electrolyte turns gray in color, the asperity-filling metal being selected from the group consisting of nickel and its alloys, copper and its alloys, and 300-series stainless steel, but not lead and its alloys;

heating the electrolyte and deposited asperity-filling metal to a temperature above the melting point of sodium; and depositing sodium onto the electrolyte surface and permitting the sodium to wick along the surface of the electrolyte.

9. The method of claim 8, wherein the step of mechanically rubbing includes the step of rubbing asperity-filling metal powder onto the surface.

10. The method of claim 8, wherein the step of mechanically rubbing includes the step of providing asperity-filling metal powder with a particle size of from about 2 to about 3 micrometers.

11. The method of claim 8, wherein the step of mechanically rubbing includes the steps of furnishing a piece of bulk asperity-filling metal, and rubbing the piece of bulk asperity-filling metal against the surface of the electrolyte.

12. The method of claim 8, wherein the step of mechanically rubbing includes the step of providing nickel as the asperity-filling metal.

13. A method of preparing a beta-double prime aluminum oxide solid electrolyte for wetting by a liquid electrode material, comprising the steps of:

furnishing a beta-double prime aluminum oxide solid electrolyte of an electrolytic cell;

mechanically rubbing an asperity-filling metal against a first surface of the solid electrolyte until the solid electrolyte turns gray in color, the asperity-filling metal being selected from the group consisting of nickel and its alloys, copper and its alloys, and 300-series stainless steel, but not lead and its alloys;

heating the electrolyte and deposited asperity-filling metal to a temperature of about 150° C.;

depositing sodium onto the first surface of the solid electrolyte; and increasing the temperature of the electrode to about 265° C. and maintaining the temperature for a time sufficient to permit the molten sodium to wick across the first surface of the solid electrolyte.

14. The method of claim 13, wherein the step of mechanically rubbing includes the step of providing nickel as the asperity-filling metal.

* * * * *